United States Patent [19]
Yoshida

[11] Patent Number: 5,307,179
[45] Date of Patent: Apr. 26, 1994

[54] FACSIMILE APPARATUS, AND METHOD OF COMMUNICATION

[75] Inventor: Takehiro Yoshida, Tokyo, Japan

[73] Assignee: Canon Kabushiki Kaisha, Tokyo, Japan

[21] Appl. No.: 775,090

[22] Filed: Oct. 11, 1991

[30] Foreign Application Priority Data
Oct. 15, 1990 [JP] Japan .................... 2-273242

[51] Int. Cl.⁵ .............................................. G06F 3/14
[52] U.S. Cl. ................................... 358/440; 358/407
[58] Field of Search ......................... 358/434–438, 358/440, 400, 402, 407; 359/100

[56] References Cited
U.S. PATENT DOCUMENTS

| | | | |
|---|---|---|---|
| 3,920,895 | 11/1975 | Vieri et al. ............. | 358/407 |
| 4,106,060 | 8/1978 | Chapman, Jr. ......... | 358/402 |
| 4,207,598 | 6/1980 | Reich et al. ........... | 358/407 |
| 4,654,718 | 3/1987 | Sueyoshi ................ | 358/440 |
| 4,729,033 | 3/1988 | Hoshida ................. | 358/257 |
| 4,994,926 | 2/1991 | Gordon et al. ........ | 358/440 |
| 5,016,115 | 5/1991 | Calkins .................. | 358/402 |
| 5,168,376 | 12/1992 | Motohama ............. | 358/402 |

*Primary Examiner*—Stephen Brinich
*Attorney, Agent, or Firm*—Fitzpatrick, Cella, Harper & Scinto

[57] ABSTRACT

In accordance with a setting which decides whether reception from a party other than a specific party is to be refused, the communication mode of the communicating party is discriminated from among a plurality of communication modes upon changing over an identification signal, and communication is carried out based upon the results of the discriminating operation.

5 Claims, 5 Drawing Sheets

FACSIMILE APPARATUS, AND METHOD OF COMMUNICATION

BACKGROUND OF THE INVENTION

This invention relates to a facsimile apparatus and to a method of communication. More particularly, the invention relates to a facsimile apparatus and communication method having a plurality of communication modes, in which reception from parties other than specific parties can be refused.

Facsimile apparatus having a plurality of communication modes include those having G2 and G3 functions. Among these apparatus, some are designed to enable refusal of reception from parties other than specific parties.

The operation of such a conventional facsimile apparatus will be described.

First, the telephone number of a specific party from which reception is allowed is registered in the facsimile apparatus in advance. When an incoming call is received by this facsimile apparatus, an initial identification signal of a G3-standardized transmission procedure is transmitted to the calling party in order to identify whether the mode is G2 or G3. If the corresponding NSS/TSI/DCS signal is received from the other party, communication is performed in the G3 mode. In a case where the telephone number of the TSI signal sent from the other party's transmitter coincides with the above-mentioned registered telephone number of the party, reception processing is executed. On the other hand, if the telephone number of the TSI signal does not coincide with the registered telephone number of the other party, or if the TSI signal is not sent from the other party's transmitter, reception processing is not executed.

If a GC2 signal is received in response to transmission of a G2-standardized initial identification signal, communication is performed in the G2 mode. In this case, however, a collation of telephone numbers cannot be carried out. Consequently, a response to GC2, LCS, PHS signals cannot be made, and a protocol error occurs.

In the example of the prior art described above, the G3 and G2 initial identification signals are transmitted in alternating fashion in order to identify whether the mode is G2 or G3. When the corresponding answer signal is received, a declaration is made to the effect that there is a reception capability in either of the two modes G2 and G3.

However, allowing reception solely from a specific party in the G2 mode is not feasible in actuality since collation of telephone numbers is impossible. Performing communication (specifically, transmitting GI2) upon declaring that a G2 function is available in response to a GC2 signal is wasteful of transmission time and is undesirable in terms of making effective use of the apparatus.

SUMMARY OF THE INVENTION

An object of the present invention is to provide a facsimile apparatus, as well as a communication method, in which communication efficiency and the efficiency at which the apparatus is utilized are raised by making it possible to refuse a predetermined communication mode in a reception refusal state.

According to the present invention, the foregoing object is attained by providing a facsimile apparatus which comprises setting means for setting whether reception from a party other than a specific party is to be refused, discriminating means for discriminating the communication mode of the communicating party upon changing over initial identification signals, which are for identifying individual communication modes, in accordance with the setting of the setting means, and control means for controlling communication based upon results of discrimination performed by the discriminating means.

According to the present invention, the foregoing object is attained by providing a communication method which comprises the steps of setting whether reception from a party other than a specific party is to be refused, discriminating the communication mode of the communicating party upon changing over initial identification signals, which are for identifying individual communication modes, in accordance with the results of the setting, controlling communication based upon results of discrimination, and refusing reception in a predetermined communication mode in a case where the setting is such that reception is to be refused.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the accompanying drawings.

Figure 1A:
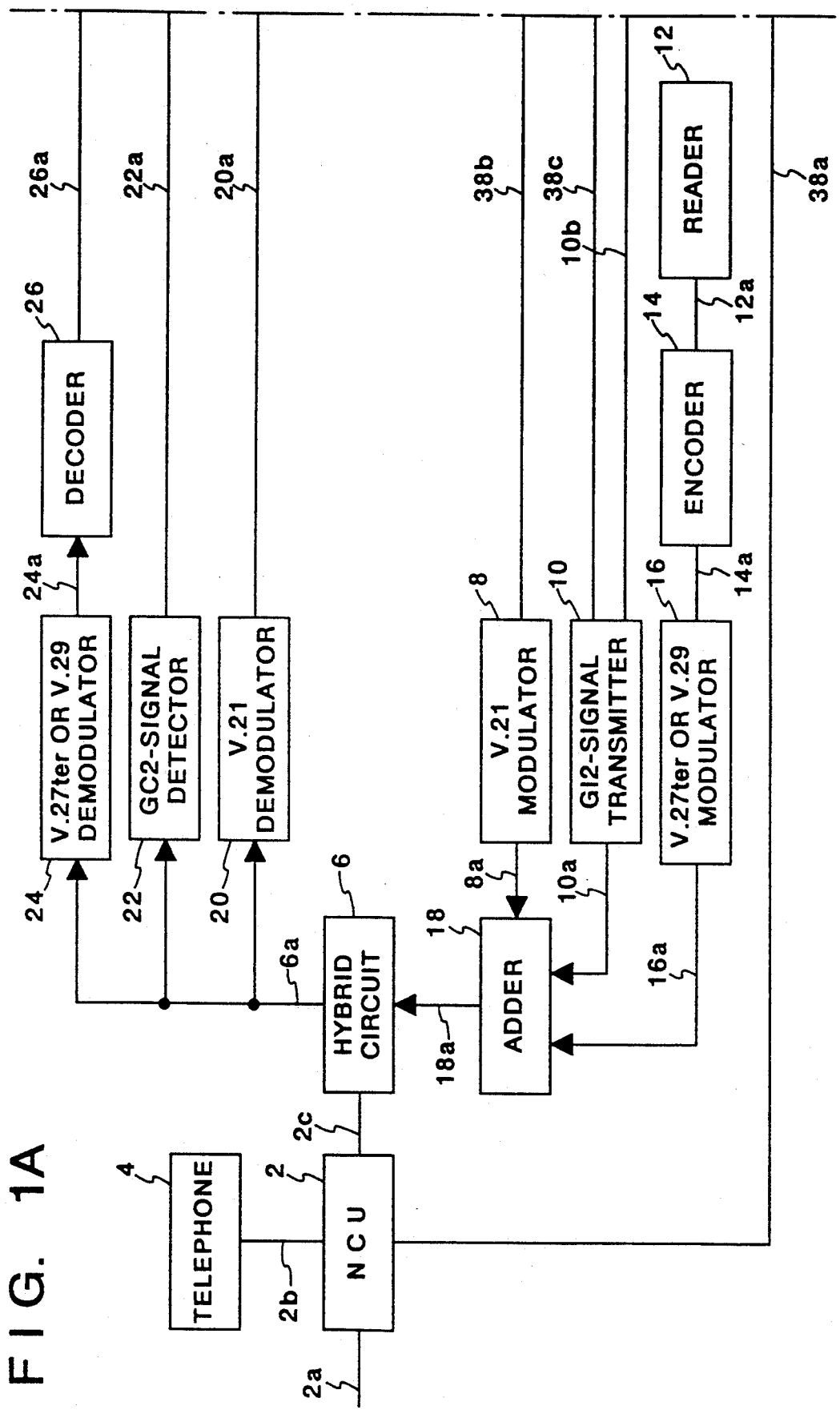
FIGS. 1A and 1B are block diagrams illustrating the construction of a facsimile apparatus embodying the present invention.
Figure 1B:
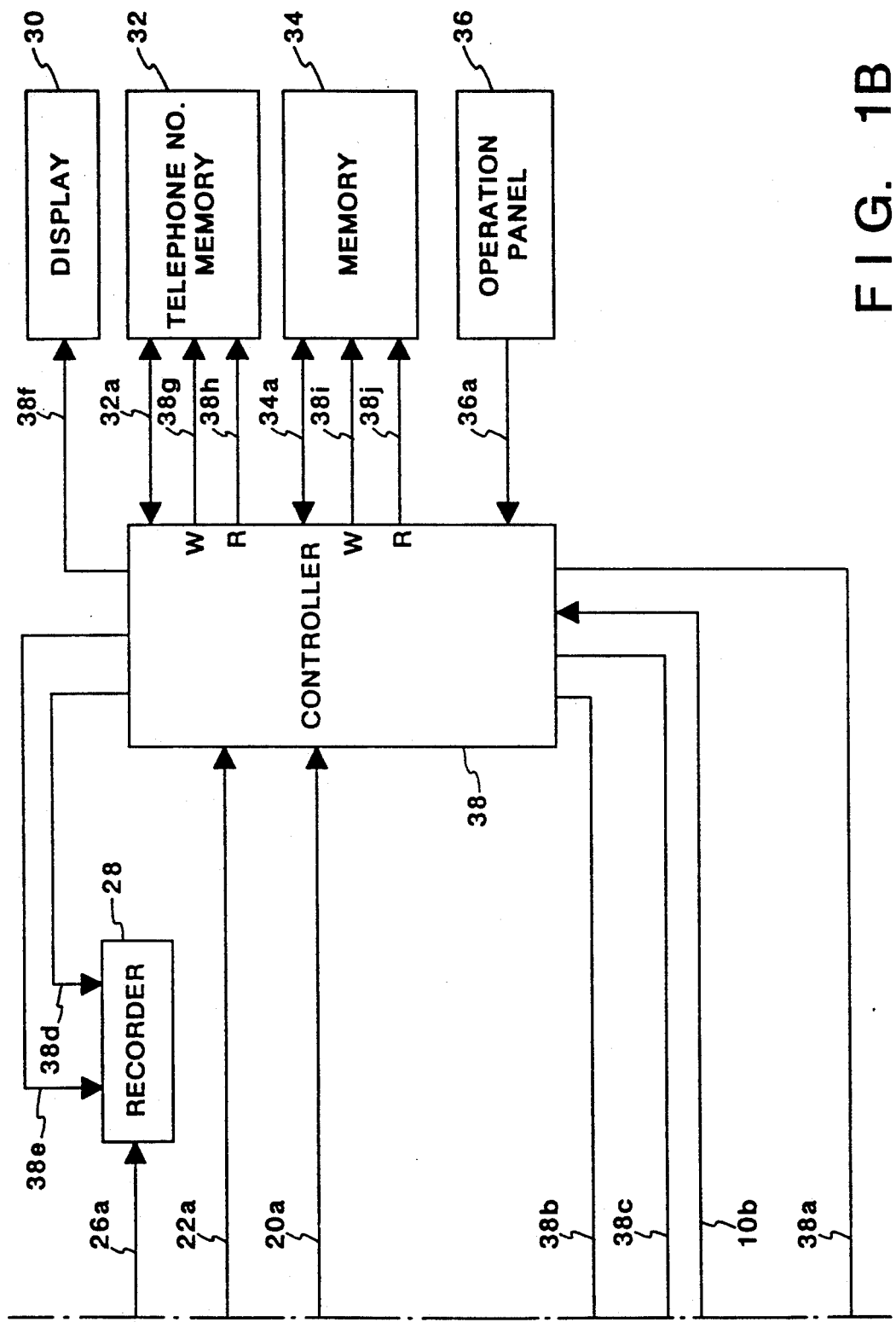

FIG. 1 is a block diagram showing the construction of the facsimile apparatus according to the invention.

In FIG. 1, numeral 2 denotes a network control unit (NCU) connected to a line for the purpose of controlling the connection to a telephone network in order to use the telephone network for data communication or the like, changing over to a data communication line, maintaining a loop, etc. A signal line 38a from a control circuit 38, described below, is connected to the input side of the NCU 2. When the signal level on signal line 38a is "0", the NCU 2 connects a telephone line 2a to the side of a telephone 4, namely to a signal line 2b. If the signal level on the signal line 38a is "1", on the other hand, the NCU 2 connects the telephone line 2a to the side of the facsimile apparatus, namely to a signal line 2c. The telephone line 2a ordinarily is connected to the side of the telephone 4.

Numeral 6 designates a hybrid circuit which separates signals into those of the transmission system and those of the reception system. More specifically, a transmission signal on a signal line 18a is transmitted to the telephone line 2a through a signal line 2c and the NCU 2. A signal which has been sent from the side of a communicating party enters the hybrid circuit 6 via the NCU 2 and signal line 2c, and the signal is outputted from the hybrid circuit 6 to a signal line 6a. Numeral 8 denotes a V.21 modulator which performs modulation based upon the well-known CCITT recommendation V.21. A procedure signal on a signal line 38b enters the modulator 8, which proceeds to modulate the signal and deliver the modulated data to a signal line 8a.

Numeral 10 denotes a GI2-signal transmitting circuit for transmitting a GI2 signal, which is a group verification signal. When a GI2-signal transmission start pulse is produced on a signal line 38c, the GI2-signal transmitting circuit 10 transmits a GI2 signal on a signal line 10a. Numeral 12 denotes a reading circuit constituted by an image sensing element, such as a CCD (charge-coupled device), and an optical system. The reading circuit 12 reads a document, which is to be transmitted, line by line in the main scanning direction, converts the read image signal into signal series representing two values of white and black, and outputs the signal series, which has thus been converted into the two values of white and black, on a signal line 12a.

Numeral 14 denotes an encoding circuit, to which the signal series from the reading circuit 12 is inputted, for encoding the input signal [by means of a modified Huffman (MH) or modified READ (MR)] and delivering the encoded data to a signal line 14a. Numeral 16 designates a modulator for performing modulation based upon the well-known CCITT recommendation V.27 (differential-phase modulation) or V.29 (orthogonal modulation). The modulator 16 modulates the input data from signal line 14a and outputs the modulated data on a signal line 16a. Numeral 18 denotes an adder circuit, to which signals on signal lines 8a and 10a or 16a are inputted, for adding the inputs and outputting the result on signal line 18a.

Numeral 20 denotes a demodulator, which performs demodulation based upon the well-known CCITT recommendation V.21, for demodulating the input signal on signal line 6a and outputting the demodulated data on a signal line 20a. Numeral 22 denotes a GC2-signal detecting circuit, to which the signal on signal line 6a is inputted, for generating a GC2-detection pulse on a signal line 22a when the GC2 signal is detected.

Numeral 24 represents a demodulator, which performs demodulation based upon the well-known CCITT recommendation V.27ter (differential-phase modulation) or V.29 (quadrature modulation), for demodulating the input signal on signal line 6a and outputting the demodulated data on a signal line 24a. Numeral 26 denotes a decoding circuit, to which the signal on signal line 24a is inputted, for decoding this signal (by a modified Huffman or modified READ) and outputted the decoded data on a signal line 26a. Numeral 28a represents a recording circuit, to which the signal outputted on signal line 26a is inputted when a signal of signal level "0" is outputted on a signal line 38e, and to which a signal outputted on a signal line 38d is inputted when a signal of signal level "1" is outputted on the signal line 38e. The recording circuit 28 records the inputted signal successively one line at a time.

A display unit 30 displays input information, such as time or the status of the apparatus, that has been outputted on a signal line 38f. Numeral 32 denotes a telephone-number memory circuit for storing speed dialing numbers or abbreviated dialing numbers. When a speed dialing phone number is registered, the control circuit 38 outputs signals, which correspond to "" (where "" is any of 24 locations of from 01 to 24) and the telephone number, on a signal line 32a, and then generates a write pulse W on a signal line 38g. When an abbreviated dialing number is registered, the control circuit 38 outputs signals, which correspond to "#" (where "" is any of 100 locations of from 00 to 99) and the telephone number, on the signal line 32a, and then generates the write pulse W on the signal line 38g.

When the speed dialing information is read out, the control circuit 38 outputs "" on the signal line 32a and then generates a read pulse R on a signal line 38h. As a result, the speed dialing number designated by "" is outputted on signal line 32a from the telephone-number memory circuit 32. Similarly, when the abbreviated dialing information is read out, the control circuit 38 outputs "#" on the signal line 32a and then generates a read pulse R on the signal line 38h. As a result, the abbreviated dialing number designated by "" is outputted on signal line 32a from the telephone-number memory circuit 32.

Numeral 34 denotes a memory circuit for storing whether a reception-refusal (direct-mail prevention) state is in effect. If the memory circuit 34 has been set to the reception-refusal state, the control circuit 38 operates so as to refuse reception from a telephone number other than that of a specific party. In this embodiment, telephone numbers registered for speed dialing or abbreviated dialing are those of specific parties, namely telephone numbers from which reception is allowed.

Logical "0" is set in the memory circuit 34 in a case where reception is not refused (direct mail is not prevented), and logical "1" in a case where reception is refused (direct mail is prevented). More specifically, when information is stored in the memory circuit 34, the control circuit 38 outputs "0" or "1" on a signal line 34a and then generates the write pulse W on signal line 38i. When information that has been stored in the memory circuit 34 is read out, the stored information is outputted on the signal line 34a if the read pulse R is generated on a signal line 38j.

Numeral 36 denotes an operation panel having a ten-key pad, speed dialing keys, abbreviated dialing keys, a user software SW registration key, a setting key, etc., none of which are shown. When any of these keys is pressed, the control unit 36 outputs the corresponding key information on a signal line 36a.

The control circuit 38 controls the overall apparatus in accordance with a processing procedure (program), described below. When an automatic reception mode is in effect and the above-mentioned reception-refusal (direct-mail prevention) state has been set, the control circuit 38 operates to refuse reception from a party other than a specific party. When a manual reception mode is in effect, ordinary processing is executed irrespective of whether the reception-refusal state has been set or not.

Reception-refusal processing according to this embodiment will now be described in accordance with the flowcharts shown in FIGS. 2A through 2C.

Figure 2A:
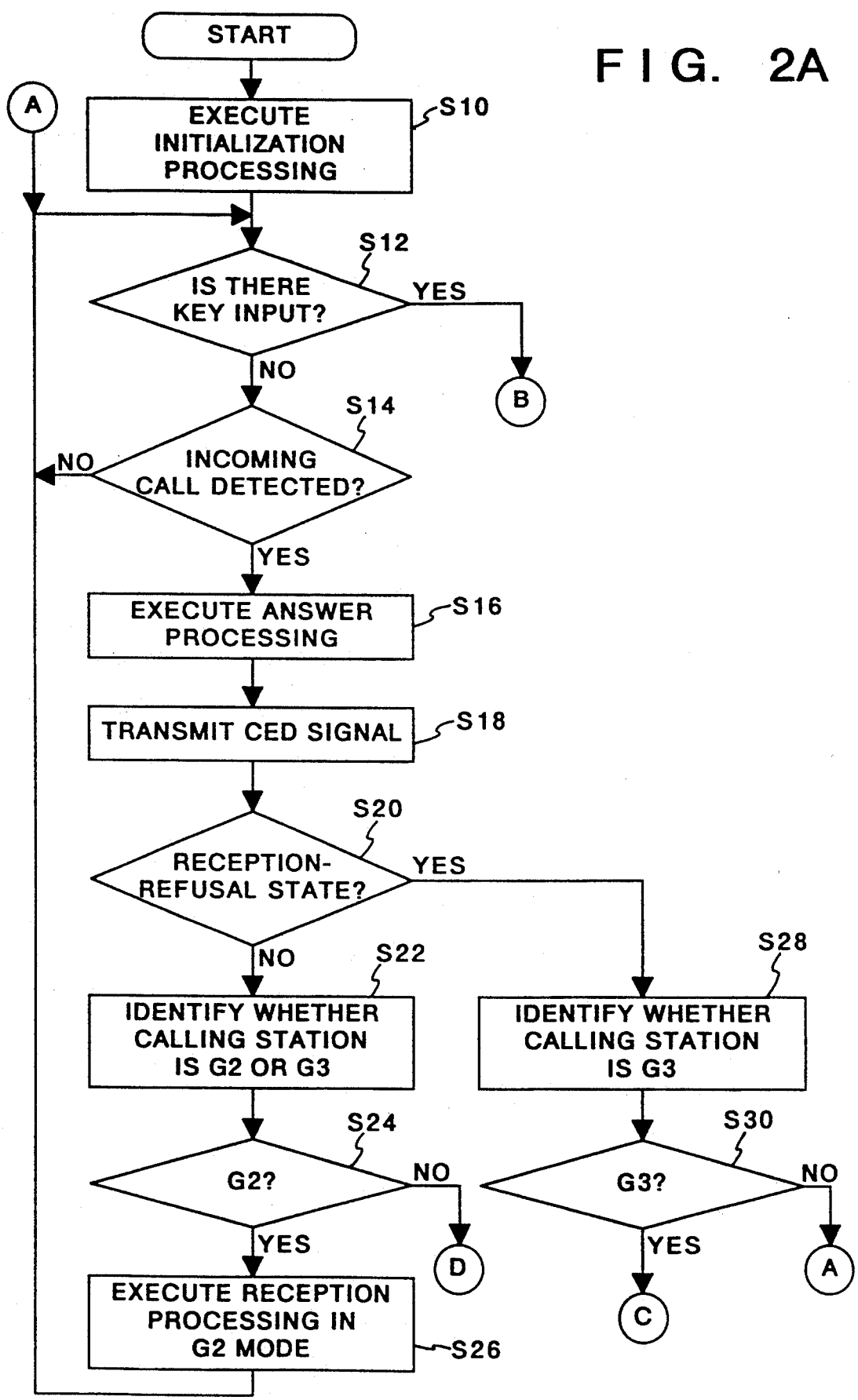
FIGS. 2A, 2B and 2C are flowcharts illustrating reception refusal processing in the facsimile apparatus embodying the present invention.
Figure 2B:
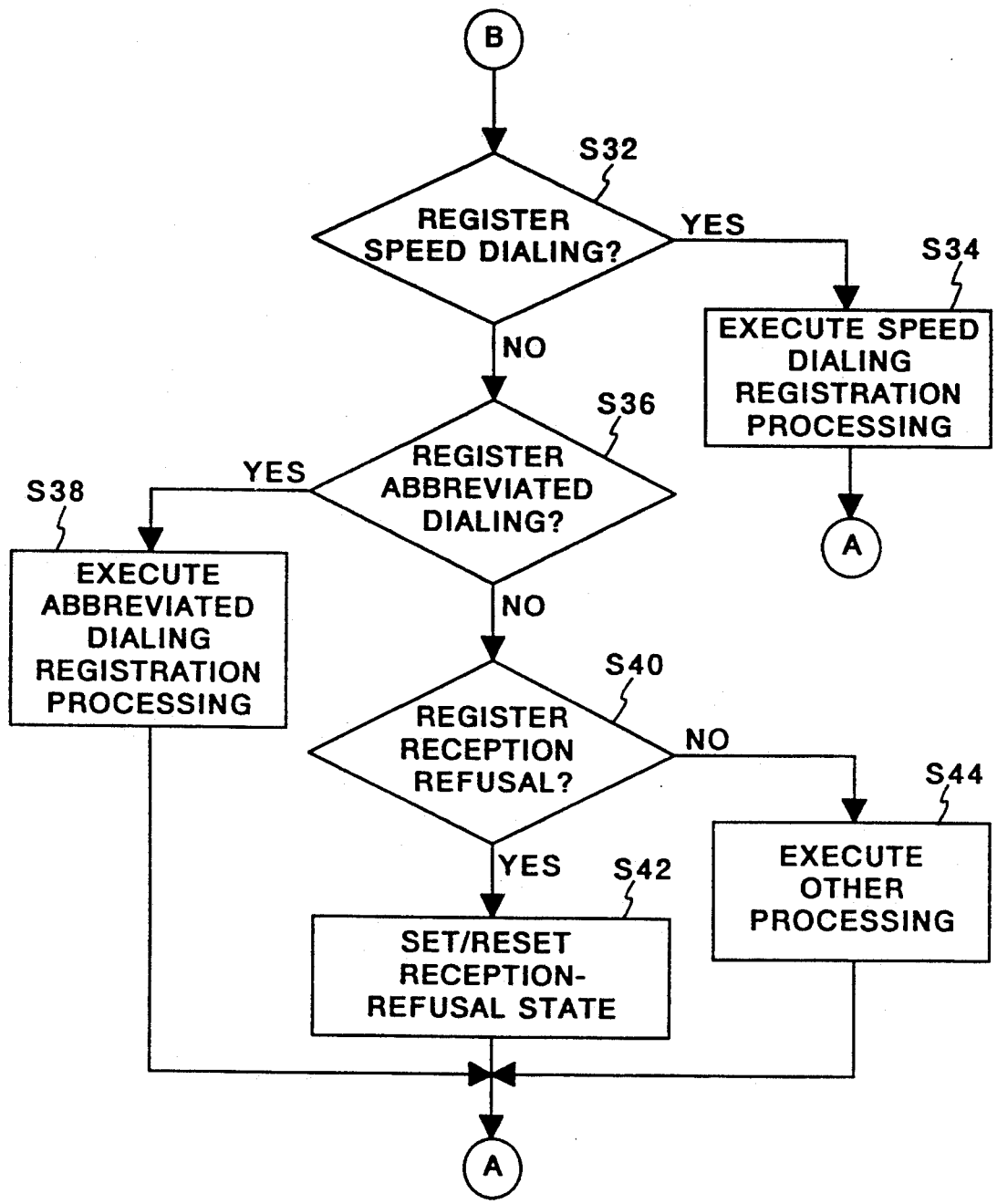

First, at step S10 in FIG. 2A, processing is executed for initializing the aforementioned peripheral circuitry, the NCU 2, reading circuit 12, memory circuit 28, display unit 30, etc. More specifically, processing is executed for setting a mode in which the NCU 2 is set to the automatic reception mode, a signal of signal level "1" is outputted on the signal line 38a, CML is turned on, a signal of signal level "0" is outputted on the signal line 38e, and the signal on signal line 26a is inputted. When this initializing processing ends, the program proceeds to step S12, at which it is determined whether a key on the operation panel 36 has been pressed. If a key has been pressed, the program proceeds to step S32 shown in FIG. 2B, at which the pressed key is analyzed.

It is determined at step S32 whether the key for registration of speed dialing has been pressed. If the answer is YES, then the program proceeds to step S34, where processing for registration of speed dialing is executed and the registered data is stored in the telephone-number memory circuit 32. However, if a NO decision is rendered at step S32, the program proceeds to step S36, at which it is determined whether the key for registration of abbreviated dialing has been pressed. If the answer at step S36 is YES, then the program proceeds to step S38, where processing for registration of abbreviated dialing is executed and the registered data is stored in the telephone-number memory circuit 32.

If a NO decision is rendered at step S36, the program proceeds to step S40, at which it is determined whether set/reset of the reception-refusal state has been performed. If set/reset of the reception-refusal state has not been performed, the program proceeds to step S44, where "other processing" is executed. However, if set/reset of the reception-refusal state has been performed, the program proceeds to step S42, where set/reset of the reception-refusal state in memory circuit 34 is executed, as described above.

If it is found at step S12 that a key on the operation panel has not been pressed, the program proceeds to step S14, at which it is determined whether the NCU 2 has detected an incoming call. If the result of the determination is that an incoming call has not been detected, the program returns to step S12, so that the processing for the key-input check and incoming call detection is executed again.

If an incoming call is detected at step S14, the program proceeds to step S16, at which ordinary answer processing is executed. Here the NCU 2 answers the incoming call by maintaining the current loop of the telephone line 2a, and sets a timer (represented by CT1) to a predetermined timer value (35 seconds). Next, at step S18, a CED signal for identifying the station called is transmitted. This is followed by step S20, at which the data in the memory circuit 34 is read out and it is determined whether the reception-refusal state has been set. If the result of the determination is that the reception-refusal state has been set, the program proceeds to step S28, at which it is determined whether the calling station is G3.

This processing entails transmitting a DIS signal (an NSF signal indicating a non-standard function, and a CSI signal indicating the identification information of the called station), indicative of the standard function of a binary control procedure standardized as a G3 transmission control procedure, on the signal line 38b, and setting a timer (represented by T4), which serves as a reception monitoring timer, to a predetermined timer value (3 seconds). Whether or not the calling station is G3 is identified by determining whether a response signal DCS (NSS, TSI) corresponding to the aforementioned DIS signal has been inputted by the time the T4 timer runs out.

More specifically, if the reception-refusal state has been set, control according to the present embodiment is performed in such a manner that the DIS signal is transmitted as an initial identification signal for identifying the calling station, and not an GI2 signal, which is indicative of an identification signal in a tonal control procedure standardized as a G2 transmission control procedure.

Next, at step S30, the result of identification is discriminated. If the mode is the G3 mode, the program proceeds to step S46, shown in FIG. 2C. If the mode is G2, i.e., if the T4 timer has run out of time, the program returns to step S12, and reception is refused.

If it is found at step S20 that the reception-refusal state has not been set, then the program proceeds to step S22, where it is determined whether the calling station is G2 or G3. This processing is ordinary discrimination processing, in which a G3 initial-identification signal and a G2 initial-identification signal are alternately transmitted and the corresponding answer signal is received, whereby the mode is identified as being G2 or G3. Next, at step S24, the result of identification performed at step S22 is discriminated. If the mode is not G2, the program proceeds to step S54 in FIG. 2C, and reception processing in the G3 mode is carried out. However, if the calling side is judged to be G2 at step S24, then the program proceeds to step S26, at which reception processing in the G2 mode is executed. When reception processing ends, the program returns to step S12.

Figure 2C:
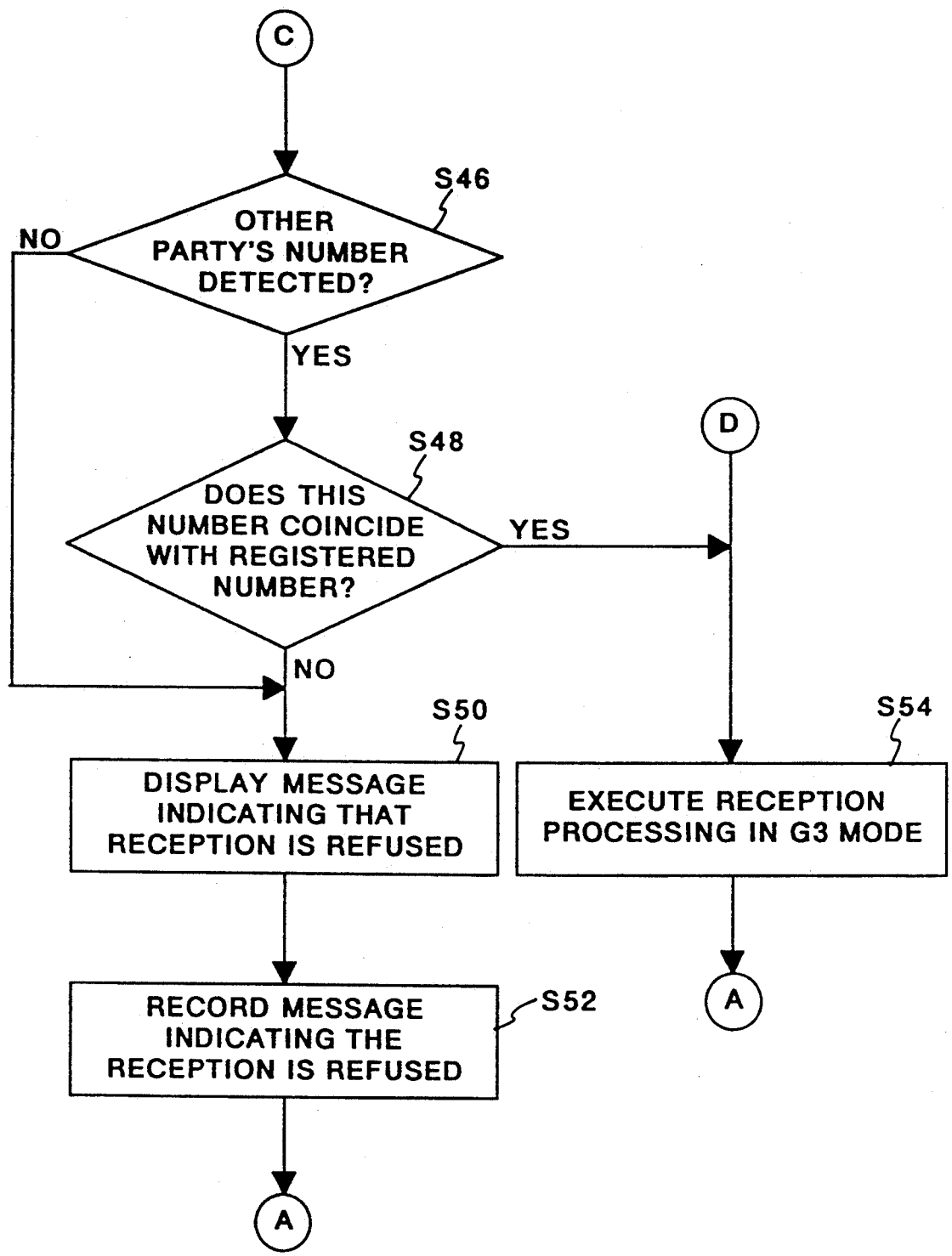

If G3 is discriminated at step S30, namely if the corresponding response signal has been received, the program proceeds to step S46 in FIG. 2c, where, in order to determine whether reception is from a specific party, a check is made to see whether the TSI signal, which is indicative of transmitting station identification, has been detected. If the TSI signal has been detected, the program proceeds to step S48, at which it is determined whether the other party's number indicated by the TSI signal coincides with the number that has been registered in the telephone-number memory circuit 32.

If the other party's number cannot be detected at step S46, or if the numbers do not coincide at step S48, then the program proceeds to step S50, at which a message, such as "Reception refused", indicating that reception has been refused, is displayed on the display unit 30. Next, at step S52, a message indicative of the fact that reception has been refused is recorded in the memory circuit. This recording processing entails recording the following message, which serves as one example, if the other party's number cannot be detected at step S46: "Reception from following party has been refused: Date__; Time__; Party's Abbreviated Name__; Party's Telephone Number__".

If the numbers are found to coincide at step S48, however, then the program proceeds to step S54, at which reception processing in the G3 mode is executed. When reception processing ends, the program returns to step S12, at which the foregoing processing is repeated. Thus, according to the present invention, as described above, when there is an incoming call from a G2 calling station in the reception-refusal state (namely when the direct-mail prevention function is operating), reception is refused. In case of a G3 calling station, reception is performed when coincidence with a previously registered number is achieved. This makes it possible to raise communication efficiency as well as the utilization efficiency of the apparatus.

In the foregoing embodiment, the arrangement is such that if the manual reception mode is in effect, reception is performed irrespective of the other party even when a registration has been made so as to refuse reception from a party other than a specific party. However, it is possible to adopt an arrangement in which, when the reception-refusal state has been set, the other party's number is checked and reception is allowed only when numbers coincide, just as in the automatic reception mode.

In addition, though it has been described that speed dialing and abbreviated dialing numbers are registered beforehand as telephone numbers for which reception is allowed, the same effects can be obtained using other telephone numbers.

Furthermore, the invention is not limited to collation of telephone numbers for which direct mail is to be prevented. For example, in a case where the apparatus is effective only for the G3 function, as in a closed-region connection, effective results are obtained by transmitting an initial identification signal, without sending a G2-function signal.

In accordance with the present invention, as described above, the communication mode is identified upon changing over initial identification signals, which are for identifying individual communication modes, in accordance with whether refusal of reception has been set, and a predetermined communication mode in a reception-refusal state is refused. This makes it possible to raise communication efficiency as well as the utilization efficiency of the apparatus.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus having a plurality of communication modes, in which reception from parties other than specific parties can be refused, comprising:
    setting means for setting whether reception from a party other than a specific party is to be refused;
    discriminating means for discriminating the communication mode of the communicating party by exchanging selected initial identification signals, which are for identifying individual communication modes, with the communicating party, wherein said discriminating means selects an initial identification signal in accordance with the setting of said setting means; and
    control means for controlling communication based upon results of discrimination performed by said discriminating means.

2. The facsimile apparatus according to claim 1, wherein said control means includes reception means for refusing reception in a predetermined communication mode and for selectively allowing reception in a mode other than the predetermined communication mode in a case where said setting means has been set so as to refuse reception.

3. The facsimile apparatus according to claim 1, wherein said setting means designates a specific party using a subscriber's number.

4. A communication method having a plurality of communication modes, in which reception from parties other than specific parties can be refused, comprising the steps of:
    (a) setting whether reception from a party other than a specific party is to be refused;
    (b) discriminating the communication mode of the communication party by exchanging selected initial identification signals, which are for identifying individual communication modes, with the communicating party such that an initial identification signal is selected in accordance with the results of the setting at said step (a); and
    (c) controlling communication based upon results of discrimination at said step (b).

5. A communication method having a plurality of communication modes, in which reception from parties other than specific parties can be refused, comprising the steps of:
    (a) setting whether reception from a party other than a specific party is to be refused;
    (b) discriminating the communication mode of the communicating party by exchanging selected initial identification signals, which are for identifying individual communication modes, with the communicating party and selecting an initial identification signal in accordance with the results of the setting at said step (a);
    (c) controlling communication based upon results of discrimination at said step (b), and
    (d) refusing reception in a predetermined communication mode in a case where the setting at said step (a) is such that reception is to be refused.

* * * * *

UNITED STATES PATENT AND TRADEMARK OFFICE
CERTIFICATE OF CORRECTION

PATENT NO. : 5,307,179
DATED : April 26, 1994
INVENTOR(S) : TAKEHIRO YOSHIDA

It is certified that error appears in the above-identified patent and that said Letters Patent is hereby corrected as shown below:

ON TITLE PAGE

In [56] References Cited, under U.S. PATENT DOCUMENTS:
"Hoshida" should read --Yoshida--.

COLUMN 5

Line 65, "an" should read --a--.

COLUMN 8

Line 43, "step (b)," should read --step (b);--.

Signed and Sealed this

Eighth Day of November, 1994

Attest:

BRUCE LEHMAN

Attesting Officer     Commissioner of Patents and Trademarks